United States Patent [19]
Yamaguchi

[11] Patent Number: 5,148,717
[45] Date of Patent: Sep. 22, 1992

[54] TELESCOPIC STEERING COLUMN APPARATUS
[75] Inventor: Mikio Yamaguchi, Takasaki, Japan
[73] Assignee: NKS Ltd., Tokyo, Japan
[21] Appl. No.: 749,300
[22] Filed: Aug. 23, 1991
[30] Foreign Application Priority Data Aug. 23, 1990 [JP] Japan ................... 2-87449
Mar. 20, 1991 [JP] Japan ................... 3-24312

[51] Int. Cl.⁵ .......................................... B62D 1/18
[52] U.S. Cl. ...................................... 74/493; 74/520; 74/531; 188/67; 280/775; 403/104
[58] Field of Search ........... 74/493, 106, 520, 531; 280/775; 188/67; 403/104

[56] References Cited

U.S. PATENT DOCUMENTS

| | | | |
|---|---|---|---|
| 2,817,548 | 12/1957 | Uthemann | 403/104 |
| 4,179,137 | 12/1979 | Burke | 74/531 X |
| 4,185,936 | 1/1980 | Takahashi | 403/104 |
| 4,364,283 | 12/1982 | Ricardo | 74/531 X |
| 4,511,114 | 4/1985 | Cawley | 188/67 X |
| 4,648,624 | 3/1987 | Mouhot et al. | 74/554 |
| 4,657,281 | 4/1987 | Haldric et al. | 74/555 |
| 4,807,856 | 2/1989 | Teckenbrock | 188/67 X |

FOREIGN PATENT DOCUMENTS

| | | | |
|---|---|---|---|
| 61-220965 | 10/1986 | Japan . | |
| 62-74767 | 4/1987 | Japan . | |
| 62-115275 | 7/1987 | Japan . | |
| 1063513 | 3/1967 | United Kingdom | 188/67 |

Primary Examiner—Allan D. Herrmann
Attorney, Agent, or Firm—Helfgott & Karas

[57] ABSTRACT

A telescopic steering column apparatus has a press member for face-to-face abutment or a pair of lock members for two-point abutment and a toggle mechanism which is extended to a straight state and retracted to a bent state so that the length of the toggle mechanism is lengthened in the straight state and shortened in the bent state whereby the toggle mechanism acts as a wedge in the straight state for the face-to-face abutment or the two-point abutment.

4 Claims, 7 Drawing Sheets

TELESCOPIC STEERING COLUMN APPARATUS

BACKGROUND OF THE INVENTION

1. Field of the Invention

The present invention relates to a telescopic steering column, and, in particular, to a telescopic steering column apparatus by which the total length of a steering column having a steering shaft therethrough can be shortened and lengthened, so that the position of a steering wheel provided on the end of the steering shaft can be adjusted to match the physique and driving posture of the driver of the vehicle.

2. Description of the Prior Art

Conventionally, both a tilt steering apparatus and an expansion steering column apparatus (also referred to as a telescopic steering apparatus) are commonly known as devices for adjusting the position of a steering wheel to match the physique and driving posture of a driver of a vehicle.

Figure 1:
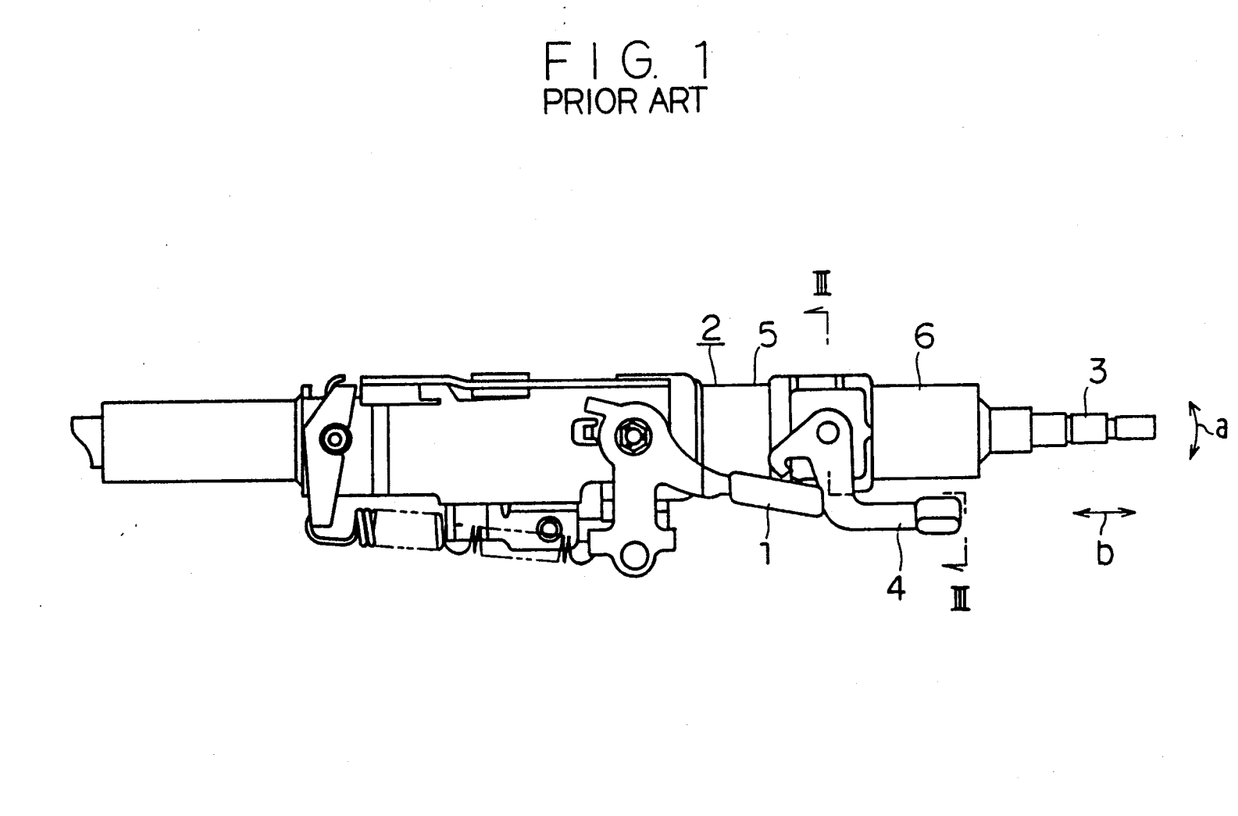
FIG. 1 is a front elevational view of a main portion of a prior art expansion steering column apparatus with a spring illustrated partly by phantom lines.

FIG. 1 shows a steering apparatus which comprises both the above-mentioned types of tilt steering mechanism and expansion steering column mechanism incorporated therein.

The tilt steering mechanism of the steering apparatus in FIG. 1 is provided by a steering shaft 3 inserted through a steering column 2. One end section (the right end in FIG. 1) of the steering shaft 3 is displaced in the direction of the arrow a in FIG. 1 by the operation of an adjustment lever 1 for adjusting the height of a steering wheel (omitted from the drawing) secured to the end section of the steering shaft 3.

In addition, the expansion steering mechanism of the steering apparatus in FIG. 1 is provided by the steering column 2 which combines an outer column 5 and an inner column 6 in a telescopic form. The steering column 2 can be extended or retracted to change its total length by operating an adjustment lever 4. One end of the telescopic steering shaft 3 is displaced in the direction indicated by the arrow b in FIG. 1, to adjust the longitudinal position of the steering wheel secured to the end section of the steering shaft 3.

Since the structure and operation of a typical tilt steering apparatus is disclosed in detail in Japanese Laid Open patent application No. 60-144569, and not essential for the present invention, further details are omitted in the present specification.

Figure 2:
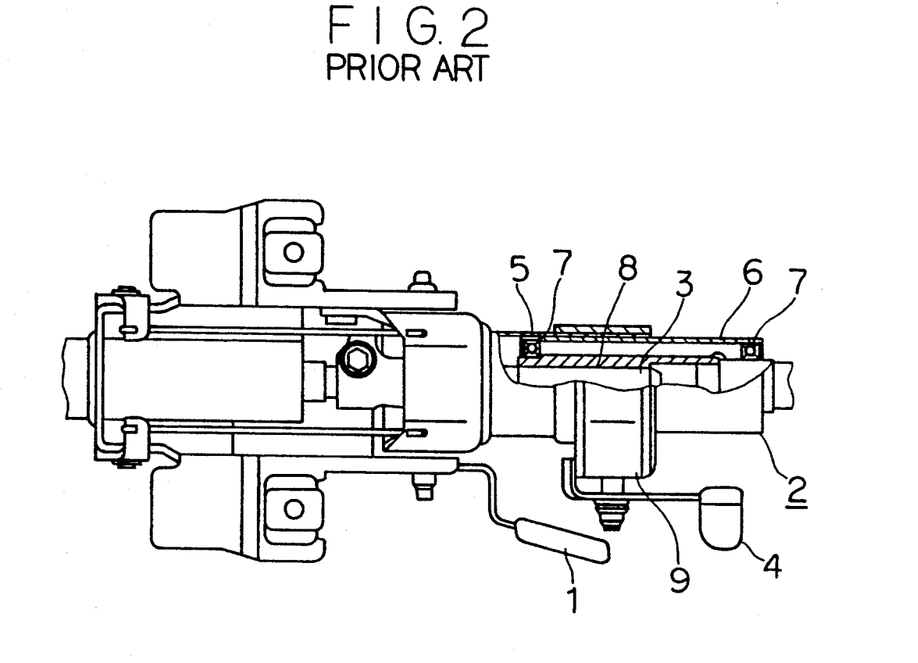
FIG. 2 is a partly cross sectional, plan view of the main portion of the prior art expansion steering column apparatus of FIG. 1.
Figure 3:
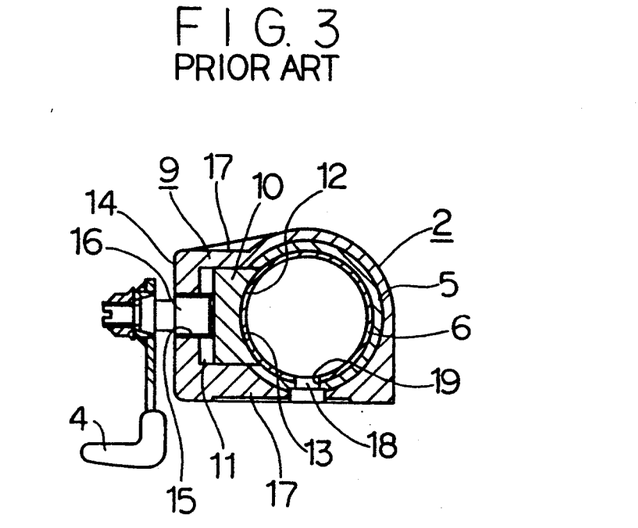
FIG. 3 is a cross sectional view taken along the line III—III of FIG. 1.

The construction of a conventional expansion steering column apparatus is illustrated in FIG. 2 and FIG. 3.

The steering column 2 comprises a cylindrical outer column 5 and a cylindrical inner column 6 combined in a telescopic form. Inside the inner column 6, the middle section of the steering shaft 3 is supported by a pair of deep-groove-type (or angular-type) ball bearings 7. The midsection of the steering shaft 3 is provided with a serrated engaging section 8, and the steering shaft 3 is extended or retracted by the telescopic action of the steering column 2.

A lock housing 9 is projected from the outer column 5 in a lateral direction (downward in FIG. 2, to the left in FIG. 3) and secured to part of the midsection of the outer column 5. A cylindrical space 11 for the insertion of a lock member 10 is provided in the lock housing 9. The lock member 10 is detailed later.

The cylindrical space 11, which is shaped as a rectangular parallelopiped, are defined at the two sides (upper and lower sides in FIG. 3) thereof by a pair of plane surfaces 17 provided with a space therebetween and parallel to the center axis of the outer column 5. A communicating opening 12 is formed through the side wall of the outer column 5 in alignment with the cylindrical space 11 to provide communication between the cylindrical space 11 and the interior of the outer column 5. The lock member 10 is inserted into the cylindrical space 11 through the opening 12, and the inner surface of the lock member 10 is adapted to abut the outer peripheral surface of the inner column 6 which axially penetrates the inside of the outer column 5.

The inside surface 13 of the lock member 10 is formed in a concave arc-shape with almost the same curvature as that of the outer peripheral surface of the inner column 6. The relative displacement of the inner column 6 and the outer column 5 can be prevented by the application of strong pressure through the arc-shaped concave surface 13 against the outer peripheral surface of the inner column 6.

A threaded hole 15 is formed in the center of a partition 14 which defines the outer side of the cylindrical space 11. The inner end of a lock screw 16 which is screwed into the threaded hole 15 abuts the center section of the outer surface of the lock member 10. The base of the adjustment lever 4 is secured to the outer end of the lock member 10. The arc-shaped concave surface 13 can be pressed against the outer peripheral surface of the inner column 6 by the operation of the adjustment lever 4.

In addition, a guide pin 18 is secured to the bottom of the lock housing 9, and penetrates the lower wall of the outer column 5. The guide pin 18 engages an elongated slot 19 which is formed in an axial direction in the lower wall of the inner column 6 so that the inner column 6 is prevented from rotating with axial movement only.

In the expansion steering column device with the above-described configuration, the adjustment of the full length of the steering column 2 is performed in the following manner.

In making the adjustment, first the lock screw 16 is retracted (to the left in FIG.3) by the operation of the adjustment lever 4. As a result, the force of the lock screw 16 pressing the lock member 10 against the outer peripheral surface of the inner column 6 is released, so that the inner column 6 can be freely displaced inside the outer column 5.

In this state, the steering wheel (omitted from the drawing) secured to the end of the steering shaft 3 is pushed or pulled to adjust its longitudinal position. As the steering wheel is pushed or pulled, the serrated engaging section 8 provided in a mid section of the steering shaft 3 is displaced, and the inner column 6 provided on the outside of the steering shaft 3 and supported by the ball bearings 7 is displaced longitudinally.

As a result, once the longitudinal position of the steering wheel has been adjusted, the lock screw 16 is advanced (moved to the right in FIG. 3) by operating the adjustment lever 4. The advancing lock screw 16 presses the lock member 10 against the outer surface of the inner column 6. This causes a strong frictional force between the arc-shaped concave surface 13 formed on the inner surface of the lock member 10 and the outer surface of the inner column 6, so that the inner column 6 is maintained on the inside of the outer column 5 with no possibility of displacement, whereby the steering wheel is maintained at the adjusted position.

However, in the operation of a conventional expansion steering column apparatus with this configuration, a large operating force is necessary to pivot the adjustment lever 4 when securing the inner column 6, because of the friction and the like in the screw section. If the operating force is reduce, the adjustment lever 4 must be pivoted through a large angle. In addition, during the operation, the person operating the lever does not have a good feel for the operation because there is no way of sensing the good feeling of adjustment.

After a specified torque has been applied to the lock screw 16, the lock screw 16 and the adjustment lever 4 are secured. In the case where the lock screw 16 and the lever member 4 are conventionally connected together by a serrated linkage, the adjustment of the positional relationship of the two members 4, 16 can only be done by one pitch of the serrations at a time, so that fine adjustment of this positional relationship is difficult.

Other examples of the structure of an expansion steering apparatus are disclosed in Japanese Laid Open patent application No. 16-145070 and No. 63-152771, but the same type of problems are found in these apparatus.

In Japanese Laid Open patent application No. 61-220965, an expansion steering column apparatus using a toggle mechanism to secure the inside column to the inside of the outside column is disclosed. However, there are some problems, e.g. the securing of the inner column is unreliable because pressure is applied at one point only on the inner column, or the wall thickness of the inner column must be very thick in order to prevent distortion of the inner column along with the securing operation.

Specifically, in the case where the inner column is secured to the inside of the outer column, a lock member is firmly pressed against the outer peripheral surface of the inner column, and since there is only one pressure point, when this lock member faces the outer peripheral surface of the inner column, a high pressure must be applied to make the securing of the inner column reliable.

With this type of high pressure, an adequate rigidity must be ensured by making the inner column thick-walled so that the inner column is not distorted. This causes the manufacturing costs to rise drastically and the weight to increase.

SUMMARY OF THE INVENTION

An object of the present invention is to provide, with due consideration to the drawbacks of such conventional devices, a telescopic steering column apparatus in which the inconveniences found in a conventional telescopic steering column apparatus have been eliminated.

The telescopic steering column apparatus of the present invention has a press member for face-to-face abutment or a pair of lock members for two-point abutment and a toggle mechanism which is extended to a straight state and retracted to a bent state so that the length of the toggle mechanism is lengthened in the straight state and shortened in the bent state whereby the toggle mechanism exert a force in the straight state for the face-to-face abutment or the two-point abutment.

In one feature of the present invention, a telescopic steering column apparatus comprises a tubular outer column and a tubular inner column combined in a telescopic shape; the outer column having a through-hole; a press member inserted into the through-hole in the outer column so as to abut the outer peripheral surface of the inner column; a nest-shaped support member projecting from the outer peripheral surface of the outer column so as to cover the press member; a toggle mechanism provided between the outer surface of the press member and the inner surface of the support member opposing the outer surface of the press member; and an adjustment lever for extending and retracting the toggle mechanism.

In another feature of the present invention, a telescopic steering column apparatus comprises a tubular outer column and a tubular inner column combined in a telescopic shape; the tubular outer column having a pair of through-holes formed in alignment in the circumferential direction at two positions spaced apart from each other; a pair of lock members which abut the outer peripheral surface of the inner column, each lock member inserted into the through-hole; a nest-shaped support member projecting from the outer peripheral surface of the outer column at a position between the pair of through-holes; a toggle mechanism provided between the inner surface of the support member and the outer surfaces of the pair of lock members; and an adjustment lever for extending and retracting the toggle mechanism.

The length of the steering column of the telescopic steering column apparatus of the present invention with the above-mentioned configuration is adjusted in the following manner.

To make the adjustment, first the toggle mechanism is retracted by the operation of the adjustment lever, and the force of this toggle mechanism applied to the outer peripheral surface of the inner column by the press member or by a pair of lock members is released so that the inner column can be freely displaced inside the outer column.

In this state, a steering wheel secured to one end of the steering shaft is pushed or pulled, and the position of the steering wheel is adjusted in the longitudinal direction by the displacement of the inner column in the longitudinal direction.

After the steering wheel has been adjusted longitudinally to the required position, the adjustment lever is operated in a direction opposite to the previously-described step to extend the toggle mechanism so that the press member or the pair of lock members are pressed strongly against the outer peripheral surface of the inner column.

As a result, a strong frictional force operates between the inner surface of the press member or the inner surfaces of the pair of lock members and the outer surface of the inner column, so that the inner column is maintained within the outer column with no possibility of displacement, to hold the steering wheel at the adjusted position.

In the another feature of the present invention, because pressure is applied to the inner column by the pair of lock members at two axially separated points, the inner column can be reliably secured with a comparatively light pressure, and no distortion of the inner column occurs even though its rigidity is not particularly high.

DETAILED DESCRIPTION OF THE PREFERRED EMBODIMENTS

An embodiment of the present invention will now be explained with reference to the drawings.

FIG. 4 to FIG. 8 shows a first embodiment of the present invention.

The outer column 5 and the inner column 6 are both formed in a cylindrical shape and are combined in a telescopic form. A through-hole 20 is formed in one section of the outer column 5. A press member 21 which can only be displaced in a direction crossing the axis of the outer column 5 (vertically in FIG. 4 and FIG. 5) is inserted into the through-hole 20. An inside surface 21a of the press member 21 is made in an arc-shaped concave shape which corresponds to the outer peripheral surface of the inner column 6. The inside surface 21a abuts the outer peripheral surface of the inner column 6. In addition, an outer surface 21b of the press member 21 is a flat surface, and an arc-shaped concave section 27 is formed at two laterally separated positions on the outer periphery 21b.

A support housing 22, secured at a midsection of the outer column 5, covers the outer periphery of the press member 21 inserted in the through-hole 20. The support housing 22 is integrally formed as a metal casting or the like, and comprises a fixed section 22a which is externally fitted without play at the midsection of the outer column 5, and a nest-shaped support section 22b which projects from the peripheral surface of the outer column 5 and covers the press member 21.

Figures 4, 7, 8:
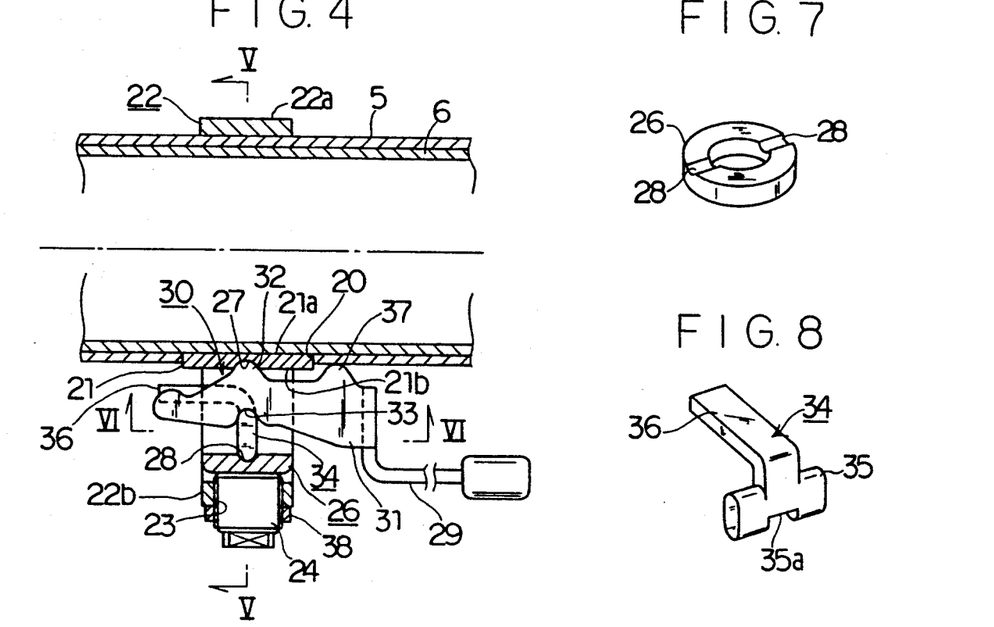
FIG. 4 is a cross-sectional view showing the principal parts of the telescopic steering column apparatus of one embodiment in the subject invention.
FIG. 7 is a perspective view of an end plate used in the telescopic steering column apparatus of FIG. 4.
FIG. 8 is a perspecitve view of a swing member used in the telescopic steering column apparatus of FIG. 4.
Figure 5:
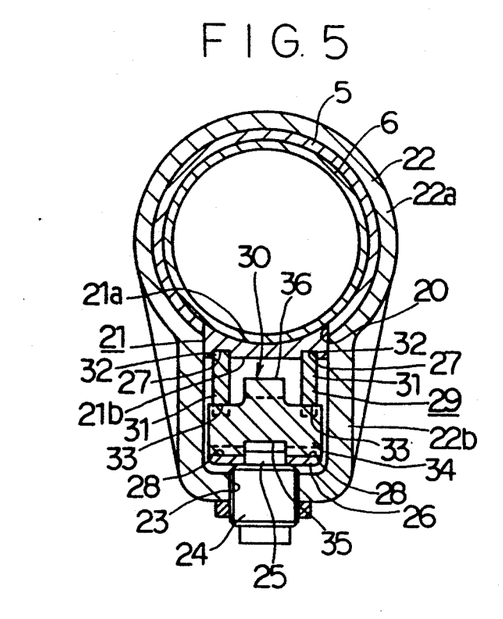
FIG. 5 is a cross-sectional view taken along the line V—V in FIG. 4.

A threaded hole 23 is formed at the midsection of the support section 22b at right angles to the outer column 5. An adjusting screw 24 is screwed into the threaded hole 23. A round projection 25 is formed at the center section of the inner surface of the adjusting screw 24, and a round, wheel-shaped end plate 26 is externally fitted onto the projection 25, as shown in FIG. 4. A pair of arc-shaped concave sections 28 is formed in the inner surface of the end plate 26.

A toggle mechanism 30 which is extended or retracted by the operation of an adjustment lever 29 is provided between a concave section 27 formed on the outer surface 21b of the press member 21 and the concave sections 28 on the inner surfce of the end plate 26 so that the force pressing the inner surface 21a of the press member 21 against the outer surface of the inner column 6 can be increased or released.

Specifically, the end (the left end in FIG. 4 and FIG. 6) of the adjustment lever 29 is fabricated by a press-forming a sufficiently rigid metal plate to form a yoke to provide a pair of parallel swinging wall sections 31. An arc-shaped projecting edge 32 formed at the midsection of the inner edge (upper edge in FIG. 4 and FIG. 5) of each of the swinging wall sections 31 engages the pair of concave sections 27 formed on the outer surface 21b of the press member 21.

An arc-shaped notch 33 is formed in the outer edge of the midsection of each swinging wall section 31 at a position exactly opposite the projecting edge 32. A swinging member 34, as shown in FIG. 8, is supported in a freely swinging manner between the arc-shaped notch 33 and the concave sections 28 in the inner surface of the end plate 26. The base 35 of the swinging member 34 has both inner and outer arc-shaped edges. A notch 35a is formed at a mid section position of the outer edge of the base 35 in a manner which does not obstruct the projection 25. Also, in the embodiment shown in the drawings, an L-shaped tongue 36 extends from an inner edge of the swinging member 34 at a midsection position. When the toggle mechanism 30 is assembled, the tongue 36 acts so that the swinging member 34 is easily set at the specified position.

In addition, an additional pair of projecting edges 37 are formed on the inner edge of the pair of swinging wall sections 31 respectively near the base end (to the right in FIG. 4). These projecting edges 37 contact the outer peripheral surface of the outer column 5 as a result of the swinging action of the swinging wall sections 31. When coming into contact, the concave section 28 on the inner surface of the end plate 26, the projecting edge 32 of the midsection position of both the inner and outer peripheral edges of the swinging wall sections 31, the concave section 27 of the press member and the notch 33 are positioned in almost a straight line. However, as will be later described, strictly speaking they are not on the same straight line.

Further, the tip ends of the swinging wall sections 31 are also adapted to come into contact with the outer peripheral surface of the outer column 5 upon the swinging action of the swinging wall section 31. During contact, the notch 33 is separated in the forward direction (to the left in FIG. 4) from the straight line linking the concave sections 27 and 28.

The adjustment of the length of the steering column, using the telescope steering column apparatus of the present invention with the structure described above, is accomplished as follows.

In the adjustment operation, first, the toggle mechanism 30 is retracted by the operation of the adjustment lever 29, and the force of the toggle mechanism 30 pressing the press member 21 against the outer peripheral surface of the inner column 6 is released.

Specifically, by swinging the adjustment lever 29 in the clockwise direction in FIG. 4 until the tip ends of the swinging wall sections 31 come into contact with the outer peripheral surface of the outer column 5, the notch 33 formed in the outer edge of the midsection of each swinging wall section 31 is displaced to the left in FIG. 4. As a result, the straight lines joining the concave section 28 on the inner surface of the end plate 26, the notch 33 of the swinging wall sections 31, the projecting edge 32 of the midsection position of the inner peripheral edge of the swinging wall sections 31 and the concave section 27 of the press member 21 form a bent at the notch 33 in FIG. 4, and the distance between the concave section 27 and the concave section 28 shrinks. The force pressing the press member 21 against the outer peripheral surface of the inner column 6 is released so that the inner column 6 can be freely axially displaced inside the outer column 5.

Accordingly, while in that state, if the steering wheel (omitted from the drawing) secured to the end of the steering shaft 3, which is inserted into the inner column 6 so that it can only rotate freely (refer to FIG. 1), is pushed or pulled so as to displace the inner column 6 in the longitudinal direction, whereby the longitudinal positon of the steering wheel is adjusted.

When the longitudinal position of the steering wheel is adjusted to the desired position, the toggle mechanism 30 is extended by swinging the adjustment lever 29 in the opposite direction to the above-described step.

Specifically, as the adjustment lever 29 is rotated counterclockwise, the projecting edges 37 formed on the inner peripheral edge (the upper edge in FIG. 4) of the swinging wall sections 31 come into contact with the outer peripheral surface of the outer column 5. The notch 33 formed in the outer edge of the midsection of the swinging wall sections 31 is moved to the right in FIG. 4 by swinging the adjustment lever 29 in the counter clockwise direction in FIG. 4. As a result, as shown in FIG. 4, the notch 33 is positioned almost on a line joining the concave sections 28 formed in the inner surface of the end plate 26 and the projecting edge 32 at the midsection of the inner peripheral edge of the swinging wall sections 31, and the distance between the concave section 27 and the concave section 28 is enlarged, so that the press member 21 is strongly pressed against the outer peripheral surface of the inner column 6.

This results in a strong frictional force operating between the inside surface 21a of the press member 21 and the outer peripheral surface of the inner column 6. The inner column 6 is therefore maintained in a non-displaceable state inside the outer column 5, and the steering wheel is maintained in the adjusted position.

In this state, the point of contact of the inner edge of the swinging member 34 and the notch 33 is positioned slightly to the right of a straight line connecting the concave sections 27 and 28 in FIG. 4. This imparts a force which causes the adjustment lever 29 to tend to pivot in the counterclockwise direction in FIG. 4, to prevent the adjustment lever 29 from pivoting inadvertently.

It will be noted that the toggle mechanism is extended to a straight state and retracted to a bent state so that the length of the toggle mechanism is lengthened in the straight state and shortened in the bent state whereby the toggle mechanism acts as a wedge in the straight state and that the toggle mechanism acts as a wedge in the straight state for the face-to-face abutment or the two-point abutment.

Also, when the adjustment lever 29 is swung, the distance between the concave sections 27 and 28 is adjusted by rotating the adjusting screw 24 so that the lock members 21 are pressed with a sufficiently strong force against the outer peripheral surface of the inner column 6. The adjusting screw 24 is prevented from inadvertently rotating after adjustment by a lock nut 38.

Figure 9:
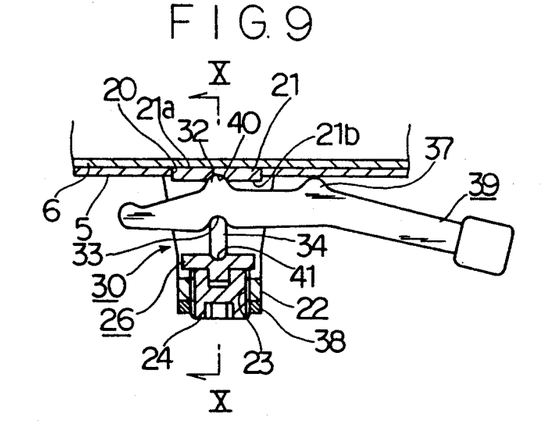
FIG. 9 is a cross-sectional view showing the principal parts of the telescopic steering column apparatus of another embodiment in the subject invention.
Figure 10:
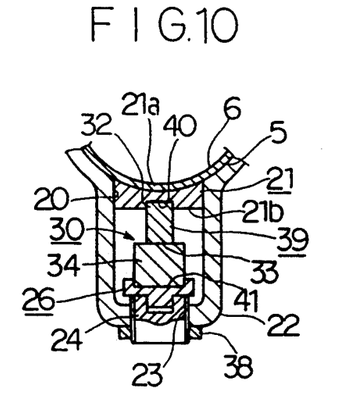
FIG. 10 is a cross-sectional view taken along the line X—X in FIG. 9.

Next, a second embodiment of the present invention is shown in FIG. 9 and FIG. 10.

Different from the above-mentioned first embodiment wherein a pair of parallel swinging wall sections 31 are formed by forming the end of the adjustment lever 29 in a yoke shape, in this embodiment, the adjustment lever 39 is formed in a one-rod shape. Then, a concave section 40 formed at the outer surface 21b of the press member 21 and a concave section 41 formed on the inner surface of the end plate 26 are formed in a single structure with a larger width.

Other than this, the structure and the operation are the same as in the first embodiment, therefore the same reference numerals have been used to designate identical parts and a detailed explanation will not be repeated.

Figure 11:
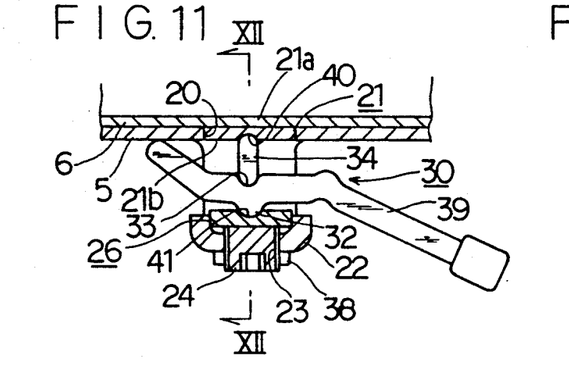
FIG. 11 is a cross-sectional view showing the principal parts of the telescopic steering column apparatus of another embodiment in the subject invention.
Figure 12:
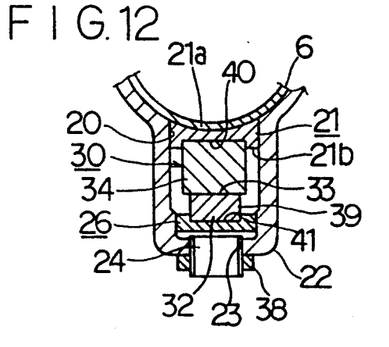
FIG. 12 is a cross-sectional view taken along the line XII—XII in FIG. 11.

Next, a third embodiment of the present invention is shown in FIG. 11 and FIG. 12.

In this embodiment, different from the first and second embodiments, the swinging member 34 is positioned near the press member 21, and the adjustment lever 39 near the end plate 26. In addition, the nest-shaped support section 22b and the outer column 5 are integrally formed from aluminum by die casting or the like, thereby reducing the number of parts.

Other than this, the structure is the same as in the second embodiment, therefore the same reference numerals have been used to designate identical parts and a detailed explanation will not be repeated.

Figure 13:
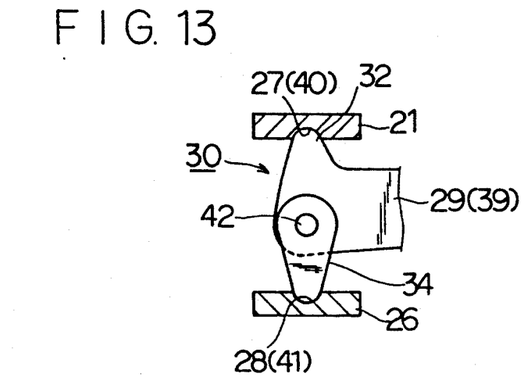
FIG. 13 is a partly cut-away, partly cross-sectional side elevational view of the adjustment lever used in the telescopic steering column apparatus in the embodiments mentioned above.
Figure 14:
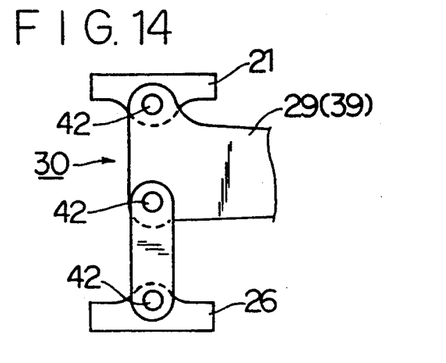
FIG. 14 is a partly cut-away side elevational view of another adjustment lever.

Incidentally, in the embodiments above, the toggle mechanism 30 formed from the adjustment levers 29, 39 and the swinging member 34 is positioned between the end plate 26 and the press member 21, it is possible to connect adjoining members by means of a pivot 42 as shown in FIG. 13 and FIG. 14.

In the structure described above in the first to third embodiments of the telescopic steering column apparatus of the present invention, because the friction on the operating parts of the adjustment lever is small, when the inner column is secured, the operating force required to pivot the adjustment lever never becomes large and no complicated operations are required. Furthermore, the operator is able to sense the good feeling of adjustment when operating the adjustment lever with a high degree of sensibility.

Figure 15:
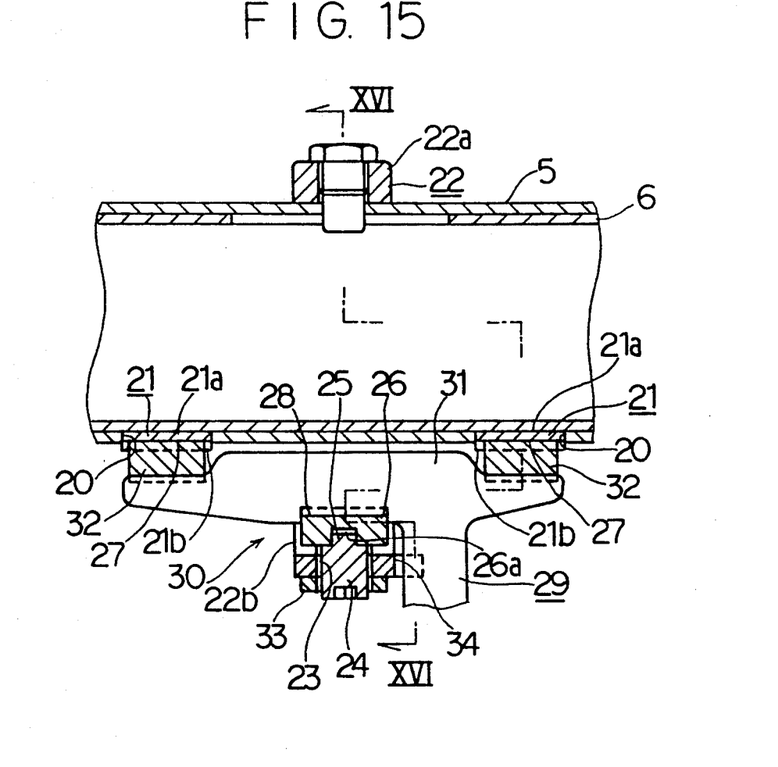
FIG. 15 is a cross-sectional view showing the principal parts of the telescopic steering column apparatus of another embodiment in the subject invention.
Figure 16:
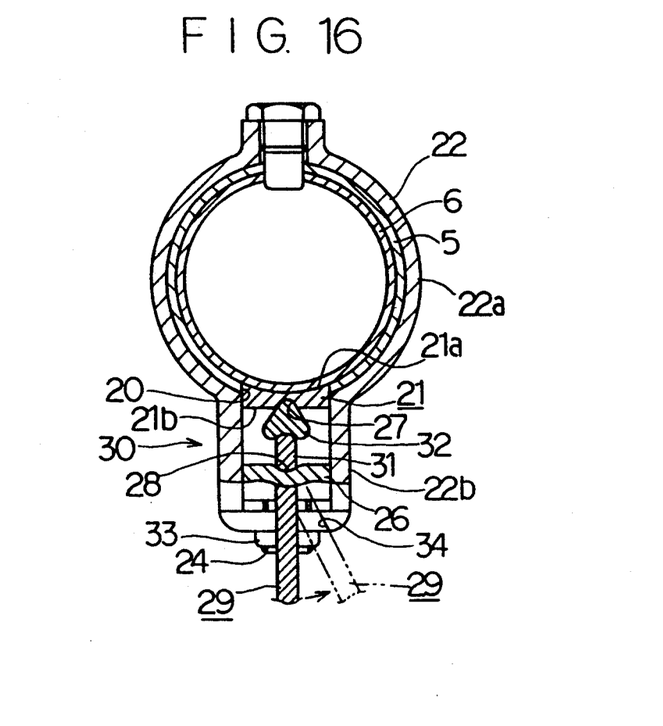
FIG. 16 is a partly cross-sectional view taken along the line XVI—XVI in FIG. 15 with an adjustment lever illustrated in one position by solid lines and in another position by phantom lines.

A fourth embodiment of the present invention is illustrated in FIG. 15 and FIG. 16. A tubular outer column 5 and a tubular inner column 6 are telescopically combined. A pair of through-holes 20 are positioned at two axially separated points in the outer column 5 and aligned in the circumferential direction.

A pair of lock members 21 are provided, each passing through the respective through-holes 20 so that these lock members 21 can only be displaced in a direction crossing the axis of the outer column 5 (the vertical direction in FIG. 15 and FIG. 16). The inner surfaces 21a of the lock members 21 are formed in a concave arc-shape in agreement with and abut the outer peripheral surface of the inner column 6. The outer surfaces 21b of the lock members 21 are flat surfaces. An arc-shaped concave groove 27 is axially formed at a circumferential midsection of each outer surface 21b.

A support housing 22 is secured at the midsection of the outer column 5 axially between the through-holes 20. The support housing 22 is integrally formed from a metal by die-casting or the like, and comprises a fixed section 22a which is externally fitted, without play, at the midsection of the outer column 5; and a nest-shaped support section 22b which projects from the peripheral surface of the outer column 5, at a position between the lock members 21.

A threaded hole 23 is formed at the midsection of the support section 22b at right angles to the outer column 5, and an adjusting screw 24 is screwed into the threaded hole 23. A round projection 25 is formed at the centersection of the inner surface of the adjusting screw 24, and the projection 25 is fitted into an insert hole 26a formed in a round plate-shaped end plate 26. In the same manner as the groove 27 in the outer surfaces of the lock members 21, an arc-shaped groove 28 is axially formed in the inner surface (the upper surface in FIG. 16) of the end plate 26.

A toggle mechanism 30 which is extended or retracted by the operation of an adjustment lever 29 is provided between the concave groove 27 formed on the outer surfaces 21b of the lock members 21 and the concave groove 28 on the inner surface of the end plate 26 so that the force pressing the inner surfaces 21a of the lock members 21 against the outer surface of the inner column 6 can be increased or released.

Specifically, a swing plate 31 is formed on the end of the adjustment lever 29 fabricated by press-forming a sufficient rigid metal plate.

Then, the outer edge (lower edge in FIG. 15 and FIG. 16) of the swing plate 31 engages the concave groove 28 in the inside surface of the end plate 26, and the inner edge of a pair of swinging members 32 formed with an almost triangular cross-section engages the concave groove 27 formed in the outer surfaces 21b of the lock members 21. The inner edge of the swing plate 31 engages a concave groove formed in the outer edge of each of the swinging members 32; the swing plate 31 and the swinging members 32 are supported in a freely swinging manner between the concave groove 27 in the outer surfaces 21b of the lock members 21 and the concave groove 28 in the inside surface of the end plate 26 to form the toggle mechanism 30.

A notch 34 is formed in the edge of the end section of the support member 22b of the support housing 22, and the base of the adjustment lever 29 engages the notch 34. Then, when the adjustment lever 29 is swung to one end of the notch 34, as shown by the solid lines in FIG. 16, the toggle mechanism 30 comprising the swing plate 31 and the swing plate 32 is extended; and when the adjustment lever 29 is swung to the other end of the notch 34, as shown by the phantom lines in FIG. 16, the toggle mechanism 30 is bent back and completely retracted.

The length of the steering column of the telescopic steering column apparatus of the present invention with the above-described structure is adjusted in the following manner.

First, the toggle mechanism 30 is released by operating the adjustment lever 29, and the force of the toggle mechanism 30 pressing the lock members 21 against the outer peripheral surface of the inner column 6 is released.

Figure 6:
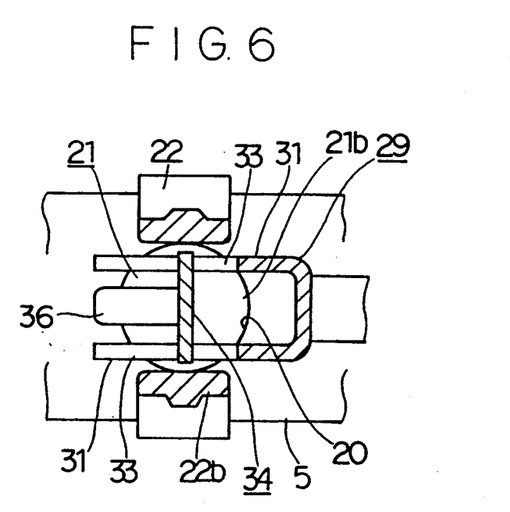
FIG. 6 is a partly cross-sectional view taken along the line VI—VI in FIG. 4.

Specifically, the adjustment lever 29 is swung in the counterclockwise direction in FIG. 16 until the base of the adjustment lever 29 comes into contact with the other end of the notch 34, as indicated by the phantom lines in FIG. 6. As a result, the straight line joining the concave groove 28 on the inner surface of the end plate 26, the outer edge of the swing plate 31, the inner edge of the swing plate 31, and the concave grooves in the outer edges of the swing members 32, and the straight line joining the concave groove 27 on the outer surfaces 21b of the lock members 21, the inner edge of the swing member 32, with the concave grooves in the outer edges of the swing members 32 and the inner edge of the swing plate 31 are bent back to form an angle in FIG. 16, and the distance between the concave groove 27 and the concave groove 28 shrinks whereby the force which presses the lock members 21 against the outer peripheral surface of the inner column 6 is released so that the inner column 6 can be freely displaced inside of the outer column 5.

Accordingly, while remaining in that state, the steering wheel (omitted from the drawing), which is secured to the end of the steering shaft 3 inserted into the inner column 6 in a manner allowing free rotation only (refer to FIG. 1), is pushed or pulled so as to displace the inner column 6 in the longitudinal direction, thereby adjusting the longitudinal position of the steering wheel.

With the longitudinal position of the steering wheel adjusted to the desired position, the toggle mechanism 30 can be extended by swinging the adjustment lever 29 in the direction opposite to that described above.

Specifically, by swinging the adjustment lever 29 in the clockwise direction in FIG. 16, the base of the lever 29 comes into contact with one end of the notch 34, as shown by the solid lines in FIG. 16. As a result, the inner edge of the swing plate 31 and the outer edges of the swing members 32 are positioned on an almost straight line joining the concave groove 28 on the inner surface of the end plate 26 with the concave groove 27 in the outer surfaces 21b of the lock members 21, and the distance between the concave groove 27 and the concave groove 28 is increased so that the lock members 21 are strongly pressed against the outer peripheral surface of the inner column 6.

This results in a strong frictional force operating between the inside surfaces 21a of the lock members 21 and the outer peripheral surface of the inner column 6, so that the inner column 6 is maintained in a non-displaceable state inside the outer column 5, and the steering wheel is maintained in the adjusted position.

Further, in this state, the point of contact of the inner edge of the swing plate 31 and the outer edge of the swing members 32, is positioned slightly to the right in FIG. 16 of a straight line connecting the concave sections 27 and 28. This imparts a force causing the adjustment lever 29 to tend to pivot in the clockwise direction in FIG. 16, to prevent the adjustment lever 29 from pivoting inadvertently.

It will be noted that the toggle mechanism is extended to a straight state and retracted to a bent state so that the length of the toggle mechanism is lengthened in the straight state and shortened in the bent state whereby the toggle mechanism acts as a wedge in the straight state and that the toggle mechanism acts as a wedge in the straight state for the face-to-face abutment or the two-point abutment.

Also, when the adjustment lever 29 is swung, the distance between the concave sections 27 and 28 is adjusted by rotating the adjusting screw 24 so that the lock members 21 are pressed with a sufficiently strong force against the outer peripheral surface of the inner column 6. The adjusting screw 24 is prevented from inadvertently rotating by means of a lock nut 33 after adjustment.

Figure 17:
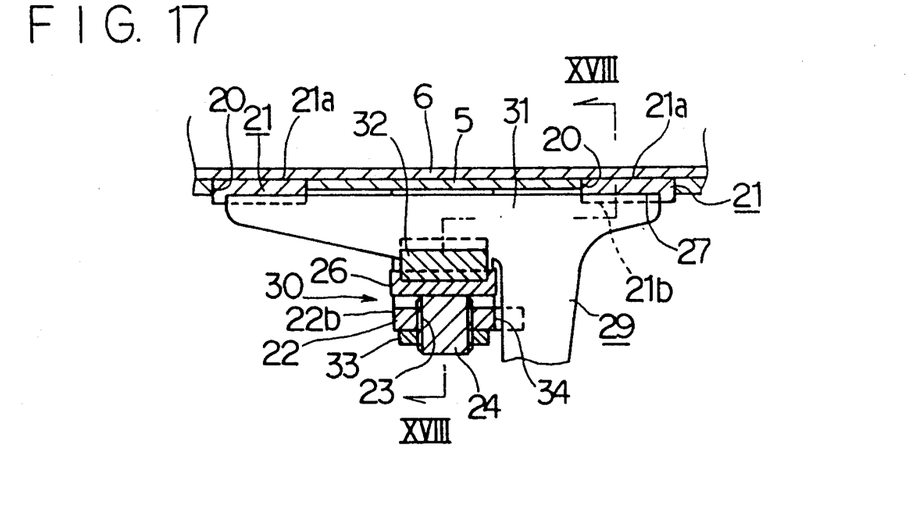
FIG. 17 is a cross-sectional view showing the principal parts of the telescopic steering column apparatus of another embodiment in the subject invention.
Figure 18:
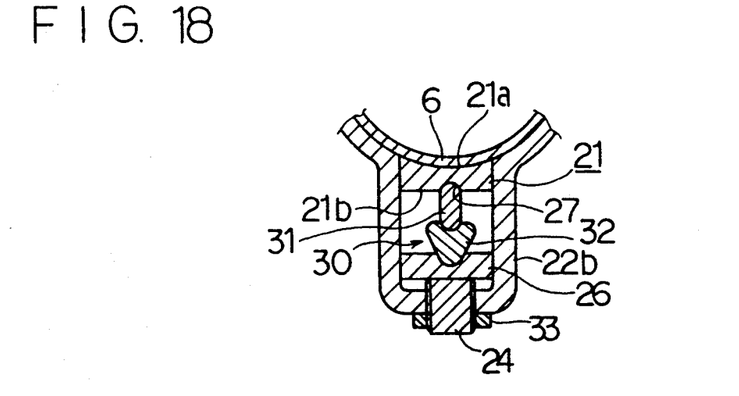
FIG. 18 is a cross-sectional view taken along the line XVIII—XVIII in FIG. 17.

Next, a fifth embodiment of the present invention is shown in FIG. 17 and FIG. 18. Different from the above-mentioned fourth embodiment wherein the swing plate 31 attached to the adjustment lever 29 is provided on the outer side or the side of the end plate 26, and the two swing members 32 are provided on the inner sides or the sides of the respective lock members 21. However, in the case of the fifthh embodiment, the swing plate 31 attached to the adjustment lever 29 is provided on the inner sides or the sides of the respective lock members 21, and one swing member 32 is provided on the outer side or the side of the end plate 26. Other than this, the structure and the operation are the same as in the fourth embodiment, therefore the same reference numerals have been used to designate identical parts and a detailed explanation will not be repeated.

Figure 19:
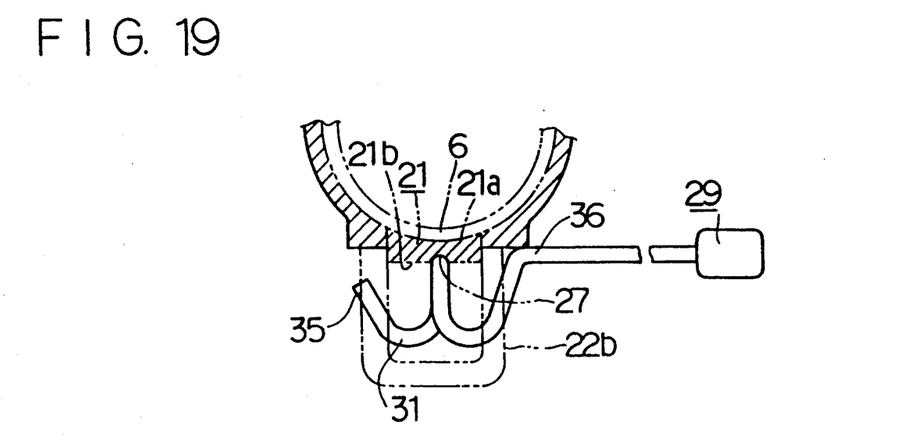
FIG. 19 is a partly cut-away front elevational view of an adjustment lever for use in an embodiment of the subject invention with part of the outer column illustrated in cross-section and with part of the inner column and support section illustrated in phantom lines.
Figure 20:
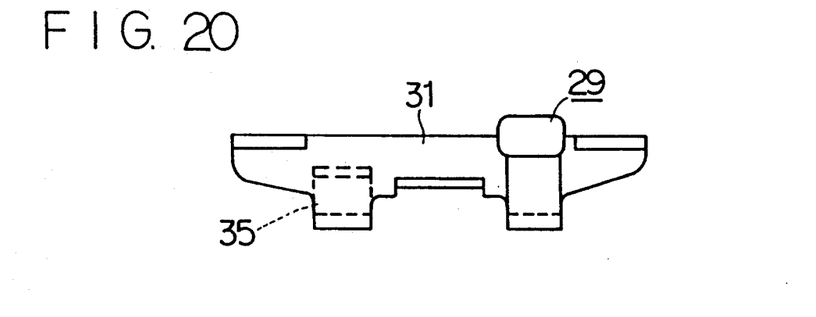
FIG. 20 is a right side elevational view of the adjustment lever of FIG. 19.

Next, a sixth embodiment of the present invention is shown in FIG. 19 and FIG. 20. Different from the above-mentioned fourth and fifth embodiments wherein the notch 34 formed in the edge of the end section of the support member 22b of the support housing 22 engages the base section of the adjustment lever 29 to control the amount of swing of the adjustment lever 29, in the present embodiment, the amount of swing of the adjustment lever 29 is controlled by projection 35, formed on the swing plate 31, and a bent back section 36, formed in the midsection of the adjustment lever 29.

Other than this, the structure is the same as in the fourth and fifth embodiments, therefore the same reference numerals have been used to designate identical parts and a detailed explanation will not be repeated.

Figure 21:
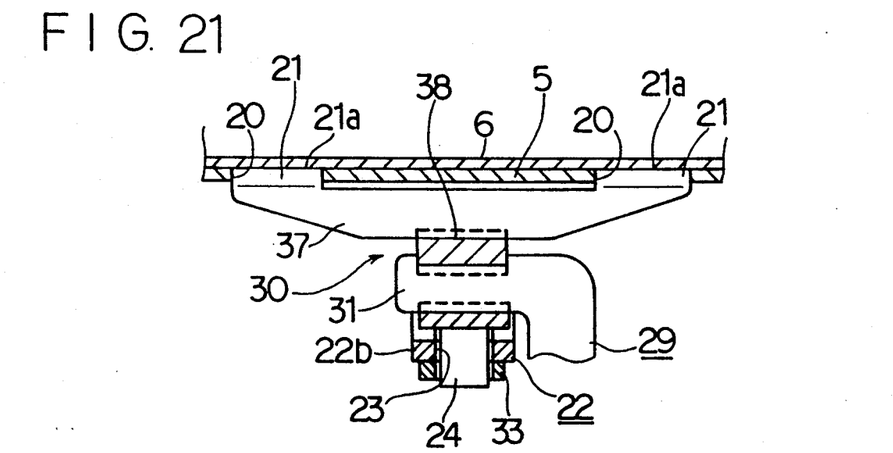
FIG. 21 is a cross-sectional view showing the principal parts of the telescopic steering column apparatus of another embodiment in the subject invention.
Figure 22:
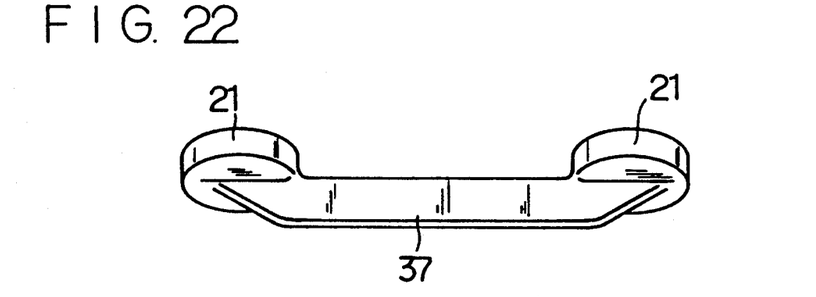
FIG. 22 is a perspective view of a pair of the lock members connected together by a link plate for use in the telescopic steering column apparatus of FIG. 21.
Figure 23:
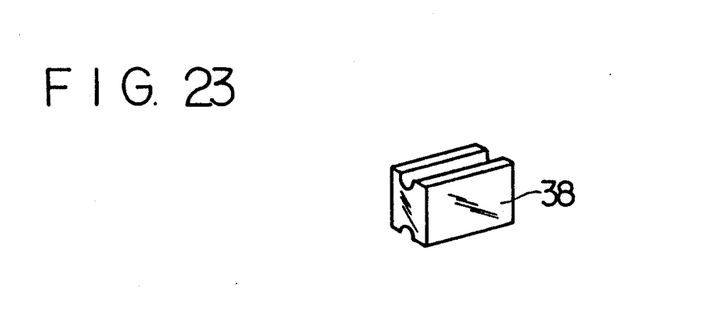
FIG. 23 is a perspective view of a swing member for use in the telescopic steering column apparatus of FIG. 21.

Next, a seventh embodiment of the present invention is shown in FIG. 21 to FIG. 23. Different from the above-mentioned fourth and fifth embodiments wherein the lock members 21 inserted into the through-holes 20 are formed separately, in the seventh embodiment, the pair of lock members 21 are linked together by means of a link plate 37. Then, a swing member with an H-shaped cross-section, as shown in FIG. 23, is provided between the link plate 37 and the swing plate 31 which is caused to swing by the adjustment lever 29.

In this embodiment, the force which presses the lock members 21, which are linked together by the link plate 37, against the outer peripheral surface of the inner column 6 can be adjusted by extending or retracting the toggle mechanism 30 comprising the swing plate 31 and the swing member 38.

Other than this, the structure is the same as in the fourth and fifth embodiments, therefore the same reference numerals have been used to designate identical parts and a detailed explanation will not be repeated.

In the structures described above for the telescopic steering column apparatus of the present invention, and because the friction on the operating parts of the adjustment lever is small, when the inner column is secured, the operating force required to pivot the adjustment lever is never large and no complicated operations are required. Furthermore, the operator is able to sense the good feeling of adjustment when operating the adjustment lever with a high degree of sensibility.

In addition, because pressure is applied to the inner column by lock members provided in two positions separated in the axial direction, the inner column can be reliably secured by a comparatively light pressure, and without any particular necessity for a high rigidity. Not only is a lower-cost fabrication and a light structure provided, but the steering column has high rigidity to withstand bending, and the steering wheel shows substantially no tendency to vibrate.

What is claimed is:

1. A telescopic steering column apparatus comprising:
   a cylindrical tubular outer column and a cylindrical tubular inner column combined in a telescopic relationship, the outer column having an outer peripheral surface and a through-hole, the inner column having an outer cylindrical peripheral surface;
   a press member having outer and inner surfaces and inserted into the through-hole in the outer column so that the inner surface of the press member is adapted to be projected from the through-hole of the outer column to abut the outer cylindrical peripheral surface of the inner column;
   a nest-shaped support member having an inner surface opposed to the outer surface of the press member and projecting from the outer peripheral surface of the outer column so as to contain the press member therein;
   a toggle mechanism provided between the outer surface of the press member and the inner surface of the support member, the press member being directly associated with the toggle mechanism so that the toggle mechanism acts directly on the outer surface of the press member; and
   an adjustment lever for extending the toggle mechanism to press on the press member against the inner column and for retracting the toggle mechanism to release the press member from the inner column.

2. The telescopic steering column apparatus of claim 1, wherein the toggle mechanism is extended to a straight state and retracted to a bent state so that the length of the toggle mechanism is lengthened in the straight state and shortened in the bent state whereby the toggle mechanism acts as a wedge in the straight state.

3. A telescopic steering column apparatus comprising:
- a tubular outer column and a tubular inner column combined in a telescopic relationship; the tubular outer column having an outer peripheral surface and a pair of through-holes formed in alignment in a circumferential direction at two axially spaced positions, the tubular inner column having an outer peripheral surface;
- a pair of lock members each having an outer surface and inserted into a respective through-hole of the tubular outer column to abut the outer peripheral surface of the inner column;
- a nest-shaped support member having an inner surface and projecting from the outer peripheral surface of the outer column at a position between the pair of through-holes;
- a toggle mechanism provided between the inner surface of the support member and outer surfaces of the pair of lock members; and
- an adjustment lever for extending the toggle mechanism to press the press member against the inner column and for retracting the toggle mechanism to release the press member from the inner column.

4. The telescopic steering column apparatus of claim 3, wherein the toggle mechanism is extended to a straight state and retracted to a bent state so that the length of the toggle mechanism is lengthened in the straight state and shortened in the bent state whereby the toggle mechanism acts as a wedge in the straight state.

* * * * *